Dec. 17, 1963 C. V. JAKOWATZ 3,114,884

ADAPTIVE FILTER

Filed Feb. 8, 1960 5 Sheets-Sheet 1

Inventor:
Charles V. Jakowatz, by Richard R. Brainard
His Attorney.

Inventor: Charles V. Jakowatz,
by Richard R. Brainard
His Attorney.

Inventor:
Charles V. Jakowatz,
by Richard R. Brainard
His Attorney.

Dec. 17, 1963 C. V. JAKOWATZ 3,114,884

ADAPTIVE FILTER

Filed Feb. 8, 1960 5 Sheets-Sheet 4

Inventor:
Charles V. Jakowatz,
by Richard R. Brainard
His Attorney.

Inventor:
Charles V. Jakowatz,
by Richard R. Brainard
His Attorney.

United States Patent Office
3,114,884
Patented Dec. 17, 1963

3,114,884

ADAPTIVE FILTER

Charles V. Jakowatz, Schenectady, N.Y., assignor to General Electric Company, a corporation of New York Filed Feb. 8, 1960, Ser. No. 7,276
30 Claims. (Cl. 328—121)

The present invention relates broadly to systems for recognizing and storing signals and more particularly to an adaptive filter for recognizing and storing unknown signals.

Information handling equipment has been employed which readily recognizes a signal corresponding to information that previously has been stored in the equipment. However, there are many applications where the signal to be recognized is not known beforehand and it would be desirable in such cases to have the system itself determine from the input received by it the nature of the signal to be recognized and stored. Such systems are disclosed and broadly claimed in the concurrently filed application of Gerald M. White, Serial No. 7,275. In accordance with the present invention an improved system, of this type, which conveniently may be called an adaptive filter, is provided. The adaptive filter stores information indicative of the input and this information is adjusted in accordance with the signal subsequently received in a way which takes into account the number of times a particular signal is received and the increasing quality of comparison between input and storage as information is recognized in such a way that the noise is eliminated. In other words, the adaptive filter automatically forgets signals which do not occur for long periods of time and establishes stored information corresponding to a signal which is repeatedly received.

Accordingly, it is an important object of the present invention to provide an improved information recognition system which compares an input signal with stored information which is derived from input singals fed into the system over a period of time.

It is a further object of the present invention to provide an adaptive filter in which the signal to be recognized is established in storage from received signals and adjusted in accordance with a weighted average of the input signals depending upon both the number of times a given signal occurs and the time that elapses between occurrences of such a signal.

It is a further object of the present invention to provide an adaptive filter which will recognize and store a signal which is buried in noise.

It is a further object of the present invention to provide an adaptive filter which will recognize a signal which is continuously changing.

In accordance with one embodiment of the invention, an electrical input including an unknown singal plus noise is impressed on a delay line. By this means, the changes that occur over a period of time corresponding to the length of the delay line may be made available at a number of taps provided on the delay line. The values of the signals at each of the taps are sampled by sampling capacitors. Also associated with each tap is a storage capacitor and a multiplier for multiplying the signal at the tap by the signal stored on the storage capacitor. The outputs of the multipliers associated with all taps are added to obtain a continuous correlation function between the stored samples and the continuous signals at the taps of the delay line. Peak values of the correlation function passing through a threshold detector operate to effect a switching operation which connects each of the sampling capacitors in parallel with its associated storage capacitor to bring these capacitors to voltage equilibrium. The threshold of operation of the threshold detector varies automatically in accordance with the interval between successive operations. As the interval gets shorter and the stored information more closely duplicates the received signal, the threshold is then higher and the contents of storage are adjusted only for higher values of the correlation function than would be required with a fixed threshold of operation. The switching of the capacitors effects a weighted averaging of the voltages on the capacitors, the weighting depending upon the ratio of the capacities of the two capacitors. In accordance with another embodiment of the invention, a plurality of adaptive filters are connected together to form an adaptive system which recognizes and stores a plurality of signals contained in the input.

A better understanding of my invention together with further objects and advantages thereof will be better understood from a consideration of the following description taken in connection with the accompanying drawing in which.

Figures 1, 4:
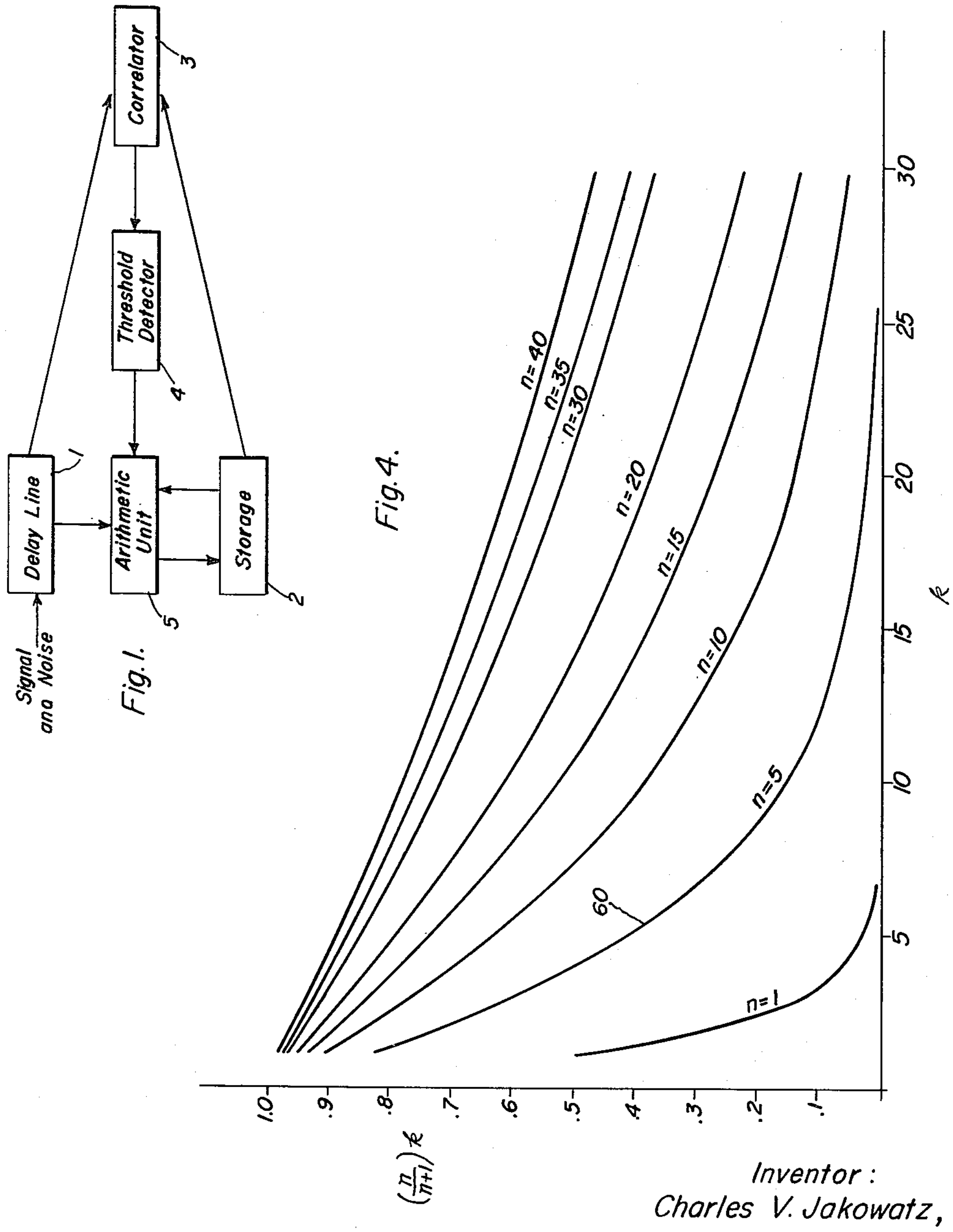
FIG. 1 is a block diagram showing the broad concept of my invention.
Figure 2:
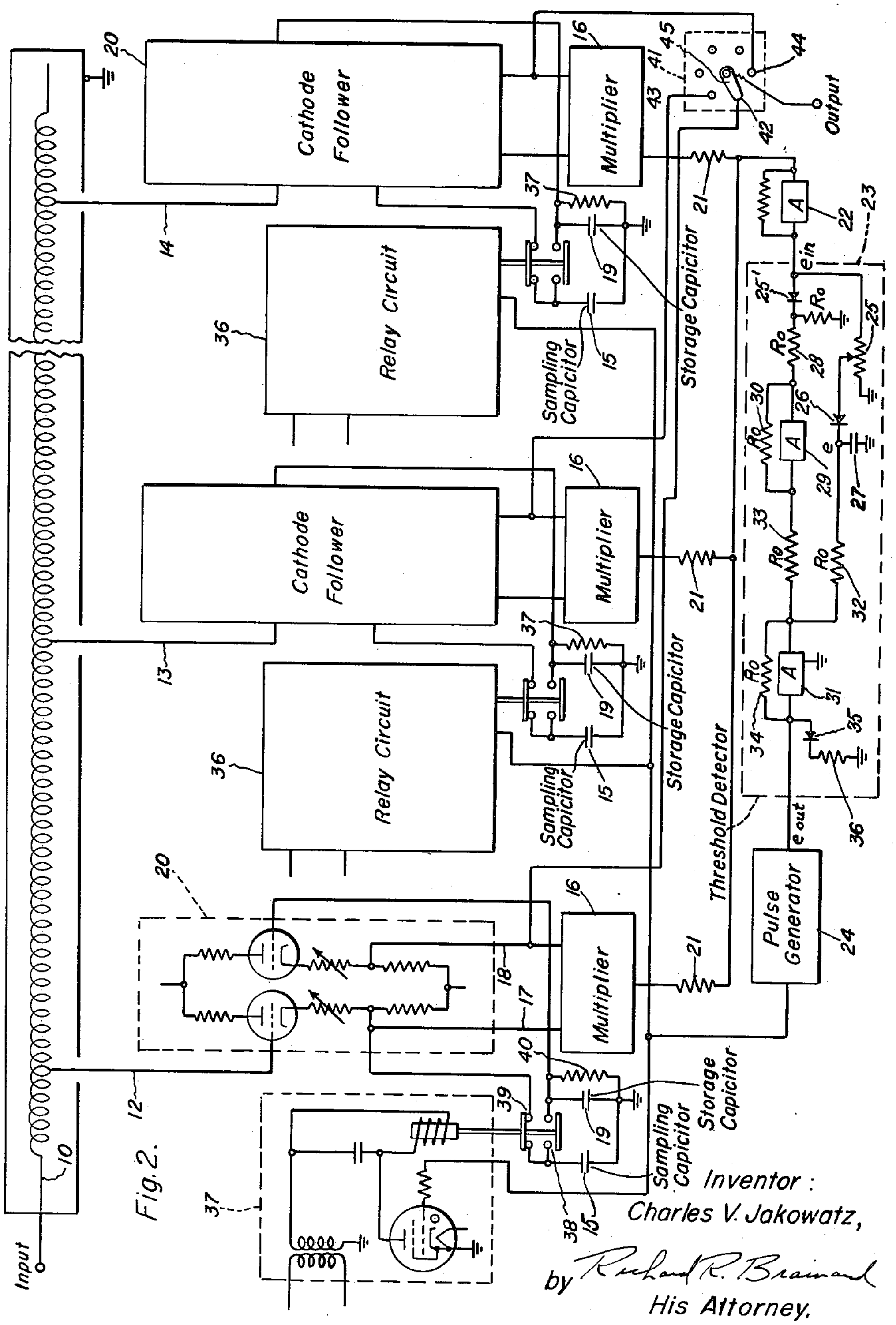
FIG. 2 is a schematic representation of an adaptive filter embodying my invention.
Figure 2A:
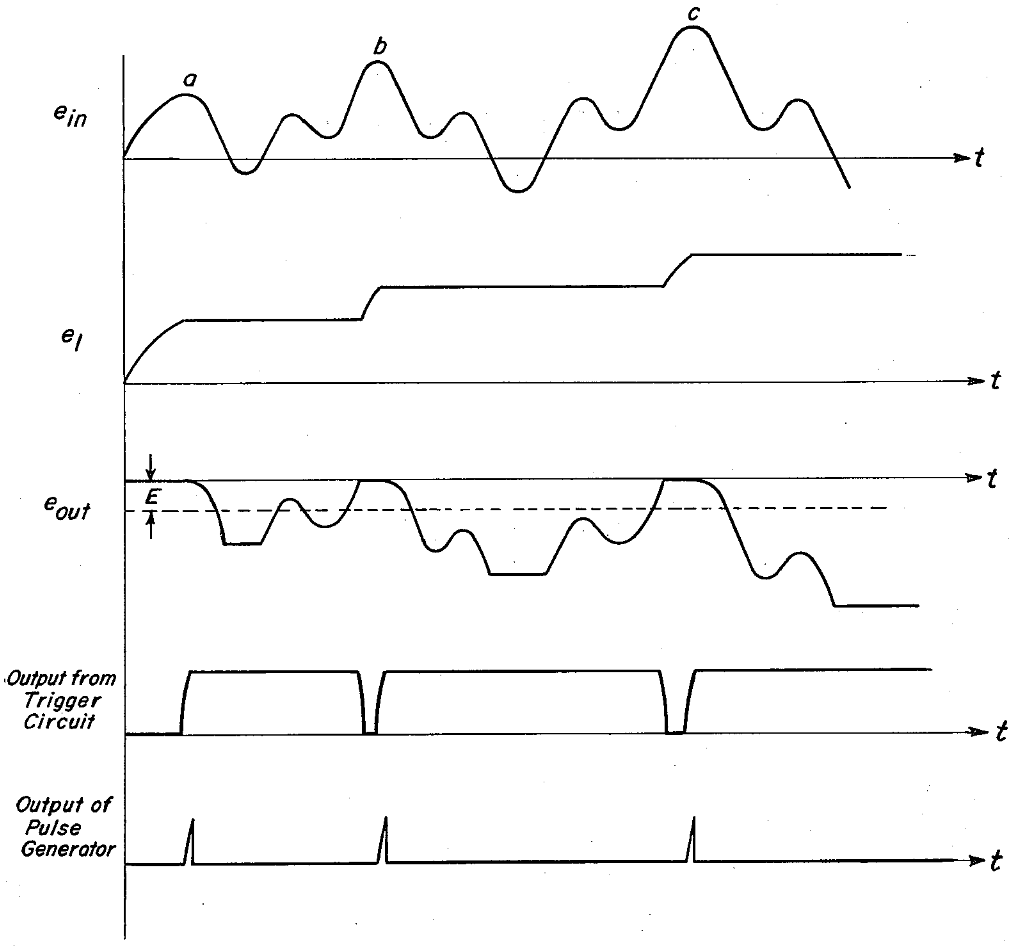
Figures 3, 3A, 3B, 3C, 3D, 3E, 3F, 3G, 3H, 3I, 3J:
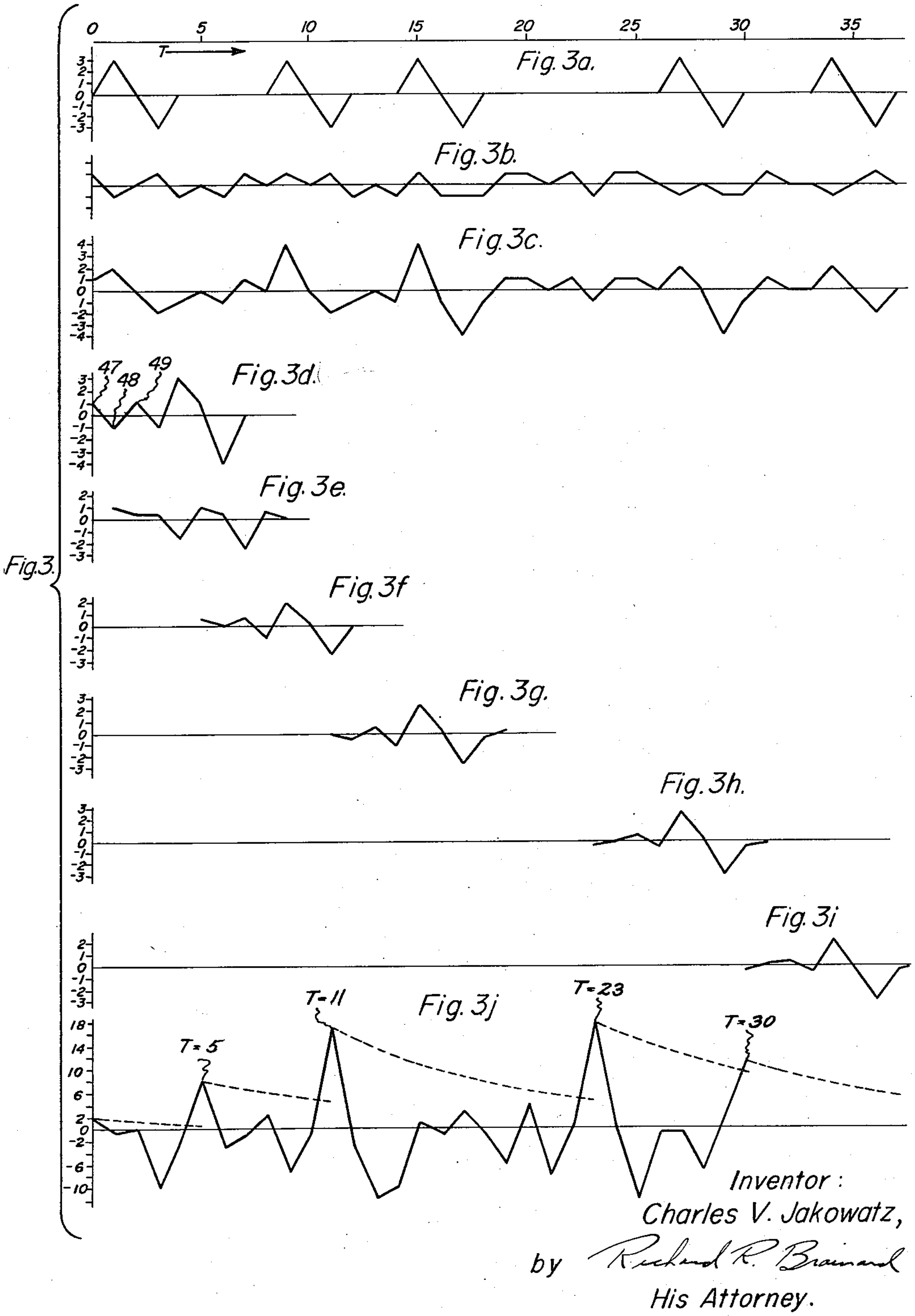
Figures 5, 6:
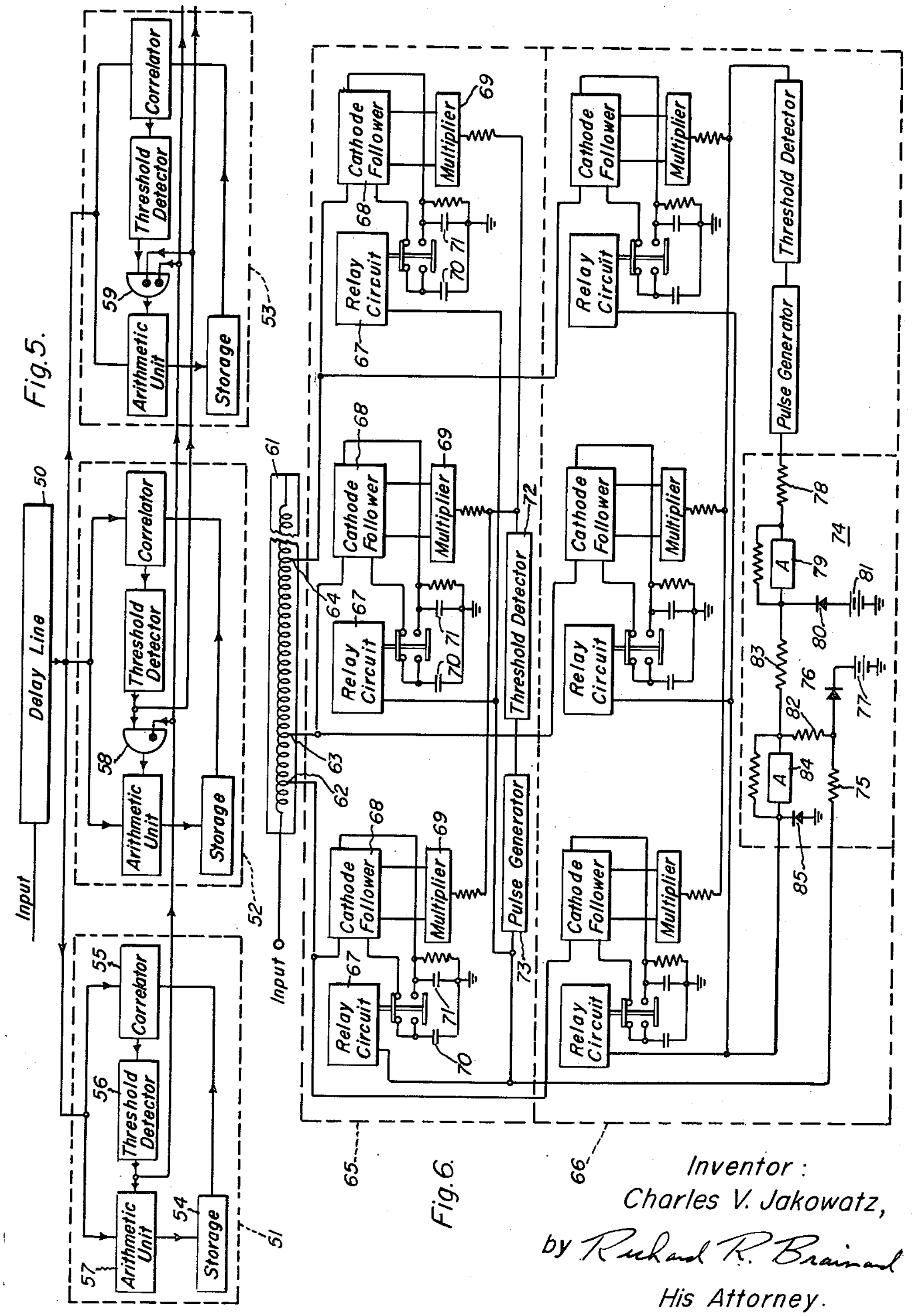

FIG. 2*a* is a set of waveform diagrams illustrating the operation of the threshold detector of the adaptive filter;

FIG. 3 is a set of waveform diagrams illustrating the operation of my adaptive filter in storing a signal contained in an input which also contains noise wherein;

FIG. 3*a* is a waveform diagram of the signal by itself;

FIG. 3*b* is a waveform diagram of the noise by itself;

FIG. 3*c* is a waveform diagram of the input containing the signal and the noise;

FIG. 3*d* is a waveform diagram of a random sample which is inserted into storage in the system to prime the system prior to the initiation of operation;

FIG. 3*e* is a waveform diagram of the signal in storage at a first instant of time;

FIG. 3*f* is a waveform diagram of the signal in storage at a second instant of time;

FIG. 3*g* is a waveform diagram of the signal in storage at a third instant of time;

FIG. 3*h* is a waveform diagram of the signal in storage at a fourth instant of time;

FIG. 3*i* is a waveform diagram of the signal in storage at a fifth instant of time;

FIG. 3*j* is a waveform diagram of the correlation function;

FIG. 4 is a set of curves which indicate the manner in which the system adapts itself to new signals;

FIG. 5 is a block diagram of an adaptive system comprising a plurality of adaptive filters; and FIG. 6 is a diagram, partly schematic, of two adaptive filters connected to form an adaptive system.

The broad concept of my adaptive filter can be described briefly in conjunction with FIG. 1 which is a block diagram of the filter. The input, containing the signal which is to be recognized together with noise which may be present, is fed into a delay line 1. To begin the recognition process a random portion of the input is placed in storage in a storage unit 2. The contents of storage are continuously compared with the input which is fed into the delay line 1. This comparison takes place in a correlator 3 which will produce a signal indicative of the correlation between the contents of storage and the input which is fed into the delay line. If a high correlation exists between the contents of storage and the input, the output of the correlator will be above a certain minimum level which will be detected by a threshold detector 4 which imposes an increasing threshold requirement as correlation improves. In such a case, the threshold detector 4 will activate an arithmetic unit 5 so that the input, which has a high correlation with the contents of storage, will be placed in storage. The arithmetic unit places the input into storage in a weighted manner so that the contents of storage will always be weighted slightly in favor of the most recent input. In this manner, a weighted arithmetic averaging of the input containing signal and noise with the contents of storage is achieved. The results of this operation are such that the noise is minimized and the contents of storage become essentially the signal without the noise after a suitable number of switching operations of the arithmetic unit. By weighting the most recent input, it is possible to introduce forgetting into the filter so that it will adapt itself to the most recent signal.

The circuit of my adaptive filter is illustrated in more detail in FIG. 2. Referring to FIG. 2, a delay line illustrated schematically as including an elongated inductive element 10 surrounded by a grounded cylindrical conductor 11 is provided with a number of taps 12, 13 and 14, equally spaced and equal in number to the number of sampling points desired. It is apparent that this delay line forms a way of providing, on the individual taps, voltages corresponding in magnitude to the input voltages that occur over a period of time equal to the delay interposed by the delay line. In other words, the delay line provides temporary storage from which the incoming signal may be sampled or "read out." In accordance with important features of the present invention, the voltage of each of the taps is continuously sampled by sampling capacitors designated as 15 and also is continuously applied as an input to a multiplier 16 by an input conductor 17. A second input to the multipliers 16 is supplied by conductors 18 from storage capacitors 19. These inputs are impressed on conductors 17 and 18 through a pair of cathode follower circuits designated generally by the numeral 20. The outputs of the multipliers, which are proportional, respectively, to the products of the voltages appearing at the taps 12, 13 and 14 of the delay line and the voltages appearing on the corresponding storage capacitors 19, are supplied through a network including resistors 21 to a direct current amplifier designated generally at 22. The resistors 21 are connected together to provide a single input to the direct current amplifier 22. The output of this amplifier is then a function of the sum of the voltages appearing at the outputs of the multipliers 16, and when a maximum occurs in this voltage it is an indication that the sum of the product of the voltages appearing at the sampling taps 12, 13 and 14 and the voltages previously stored on the corresponding capacitors 19 is a maximum. This voltage is designated $e_{in}$, the correlation function. It will be recognized by those skilled in the art that this voltage is indicative of the cross correlation between the stored and sampled voltages. It should be understood that it is within the scope of this invention to provide circuits which produce voltages indicative of other correlation functions between the stored and sampled voltages.

The output of the amplifier 22, $e_{in}$, is supplied through a threshold detector 23 to provide a keying voltage pulse for a pulse generator 24 whenever the output of the amplifier 22 reaches a peak greater than the previous peak output of this amplifier. The threshold detector 23 together with the pulse generator 24 produce an output pulse each time the correlation function $e_{in}$ reaches a peak greater than the previous peak of $e_{in}$. The threshold detector 23 compares the input to the detector, designated as $e_{in}$, with a value, designated as $e_{in/max}$, indicative of the maximum value that the input has previously attained. The output of the amplifier 22 is fed to the threshold detector 23 through variable resistor 25 and diode 25'. The tap on variable resistor 25 is connected to a diode 26 and the cathode of diode 26 is connected to a capacitor 27 which stores peak values of the voltage $e_{in}$. The voltage on the capacitor 27 is designated $e_1$.

The voltage $e_{in}$, taken from the cathode of the diode 25', is connected through a resistor 28 to an inverting amplifier 29. The inverted value of $e_{in}$ is added to the voltage $e_1$ from the storage capacitor 27. These two voltages are connected through resistors 32 and 33, respectively, to a common junction at which point the addition takes place. The result of this addition is again inverted by an inverting amplifier 31; the output of this amplifier being designated $e_{out}$. A clipping diode 35 shunts all positive values of $e_{out}$ to ground through a resistor 36.

The values of $e_{out}$ are connected to the pulse generator 24. This pulse generator 24 preferably comprises a Schmitt trigger circuit, the output of which is differentiated and amplified and connected to the relay circuits. The Schmitt trigger may be of the type shown and described on pages 99, 100, 101, and 102 of "Electronics" by Elmore and Sands, McGraw-Hill, 1949. The circuit shown in FIGURE 2.37 of this reference may be used exactly as shown except that the values of $e_{out}$ should be inverted before being fed to the input of this circuit and the +300 volts and ground potential reference levels of the circuit shown by Elmore and Sands should be changed to +200 volts and −100 volts, respectively, so that the triggering takes place around zero volts input.

The operation of the threshold detector 23 can best be described with reference to FIG. 2*a*. In FIG. 2*a* there is shown a typical correlation function curve designated $e_{in}$. The voltage $e_{in}$ is connected through diode 26 to capacitor 27 and charges capacitor 27 to a voltage indicated as $e_1$ in FIG. 2*a*. Note that $e_1$ is always indicative of the previous maximum of the voltage $e_{in}$ because the diode 26 prevents discharge of capacitor 27.

The value $e_1$ may correspond to the previous maximum of voltage $e_{in}$ or a predetermined fraction thereof depending upon the setting of the tap on resistor 25. As used in the application and particularly in the claims predetermined fraction as used in this connection includes unity. The voltage $e_1$ is added to the inverted value of $e_{in}$ taken from the inverting amplifier 29. The result of this addition is again inverted by the inverter 31 and the output of this amplifier is designated $e_{out}$ in FIG. 2*a*. Note that all positive values of $e_{out}$ have been clipped by the clipping diode 35. The waveform designated $e_{out}$ is connected to a Schmitt trigger. The output of the Schmitt trigger circuit is shown in FIG. 2*a*. The output of the Schmitt trigger goes positive when the voltage $e_{out}$ goes negative and the output of the Schmitt trigger does not return to zero until the voltage $e_{out}$ returns to zero. If the output of the Schmitt trigger is differentiated and the negative values clipped from the output, the output of the pulse generator 24 is as shown in FIG. 2*a*. It is important to note that the pulse generator 24 produces a positive output pulse coincidentally in time with the peaks of the correlation function $e_{in}$. That is, the first output pulse of the pulse generator 24 corresponds in time with the first peak, designated *a*, in the correlation function $e_{in}$. Similarly the second output pulse of pulse generator 24 corresponds in time with the second maximum peak, designated *b*, of the correlation function $e_{in}$ and the third pulse output of pulse generator 24 corresponds in time to the third maximum peak, designated *c*, in the correlation function $e_{in}$.

The operation of threshold detector 23 can be varied slightly by changing the setting of variable resistor 25. By so doing, the capacitor 27 is charged to a fraction of the peak value of $e_{in}$ and the time at which the pulse generator 24 produces an output with respect to peaks in the voltage $e_{in}$ is changed. That is, the pulse generator 24 will then produce an output slightly in advance of peaks in the voltage $e_{in}$.

The firing level and resetting level of the Schmitt trigger can also vary slightly as shown in FIG. 2*a*. This latitude in firing and resetting can be used to increase or decrease the sensitivity of the threshold detector with regard to whether or not the circuit will produce an output on the occurrence of minor peaks in $e_{in}$. The firing level of the Schmitt trigger is designated E in the waveform $e_{out}$ in FIG. 2*a*. The variation of this firing level is best explained in Elmore and Sands but it can readily be seen that such a variation increases or decreases the sensitivity of the pulse generator 24 to minor peaks in the voltage $e_{in}$.

The pulse generator 24 energizes the thyratron controlled relay circuits designated generally by the numeral 37. Each relay circuit 37 is associated with one of the sample taps 12, 13, and 14 and is operable to actuate relays each of which has a normally open set of contacts 38 and a normally closed set of contacts 39. When the relays are actuated, these contacts will interrupt momentarily the connection of sampling capacitor 15 with the delay line tap and connect it with the storage capacitor 19 to bring the voltages on these two capacitors to voltage equilibrium. This operation takes place each time a maximum occurs in the correlation function to bring the capacitors to voltage equilibrium and, in this way, effect an adjustment of the voltage on the capacitor 19. The number of samplings required to bring the capacitors 19 to a voltage corresponding to the signal is determined by the ratio of the capacities of the capacitors 15 and 19 and the character and amount of the noise in the input signal. A resistance 40 connected in parallel with each of the storage capacitors 19 determines the rate at which the storage capacitor is discharged and in this way determines the rate of forgetting, that is, the rate at which any charge corresponding to a signal which does not recur for a long period of time disappears from the pattern of voltage on the storage capacitors.

The output of the adaptive filter is taken from a commutator 41 which successively samples the voltage on each of the storage capacitors 19. Each storage capacitor is connected through its associated cathode follower 20, to one of the contacts 42, 43, 44 of the commutator 40. The rotor 45 of the commutator rotates continuously thus selectively connecting each of the storage capacitor voltages to the output which is taken from the rotor 45. The commutator rotor 45 rotates at a speed commensurate with the number of storage capacitors in the system and the duration of the signal which is being observed to provide an output which is indicative of the signal contained in the input. While a mechanical type commutator has been shown in FIG. 2, it should be understood that any suitable electronic sampling device could also be used.

Although a commutator with six contacts has been shown, the commutator will have as many contacts as there are storage capacitors in the adaptive filter. Thus, an adaptive filter having N storage capacitors will have a commutator with N contacts. It can be readily seen that such an adaptive filter would also have N cathode followers, N multipliers, N relay circuits, N sampling capacitors and a delay line have N taps.

The operation of the adaptive system in recognizing and storing a signal and rejecting the noise can best be understood by reference to the waveforms of FIG. 3. In all of the waveforms of FIG. 3, the time, T, is indicated in increments which are equal to the time delay between each tap of the delay line. The waveforms of FIG. 3 represent a hypothetical situation in which the input comprises a signal plus a small amount of noise. In FIG. 3*a* there is shown a signal which varies between +3 volts and −3 volts. This signal is repetitive but occurs randomly as shown in FIG. 3*a*. The input also contains noise which is shown in FIG. 3*b*. For this example the noise is shown as being between +1 and −1 volt. The noise also occurs randomly. The waveform of FIG. 3*c* is the algebraic sum of the signal of FIG. 3*a* and the noise of FIG. 3*b*. The waveform of FIG. 3*c* thus represents the composite input or the signal plus noise. For the purpose of illustration I have shown an input having a fairly high signal to noise ratio but my system is capable of recognizing and storing signals which are completely buried in noise.

In FIG. 3*d* there is shown a random sample of signal plus noise which is initially put into storage in the storage capacitors. For the purposes of this example it will be assumed that the adaptive filter comprises eight storage capacitors. The value of this waveform at 47 indicates the value stored in the first storage capacitor, the value of the waveform at 48 is the value stored in the second storage capacitor, the value of waveform at 49 is the value stored in the third storage capacitor and so on. The waveform of FIG. 3*e* shows the voltages stored on these eight capacitors after the first peak in the correlation function has been detected thus transferring the input from each sampling capacitor to the corresponding storage capacitor.

In the above illustration the weighting of the voltage on the sampling capacitor relative to that of the storage capacitor has been carried out with an operation $$M_{(k+1)}=\frac{nM_k+S_k}{n+1}$$

where $M_k$ is the sampled value representative of any storage tape and $S_k$ is a value of voltage transferred into storage, *k* being the number of times the operation has been performed, that is, the number of peaks in the correlation function that have occurred, and *n* is a weighting factor hereinafter explained. Similarly FIG. 3*f* shows the values in storage after the second peak in the correlation function has been detected, FIG. 3*g* represents the values in storage after the third peak in the correlation, FIG. 3*h* represents the values in storage after the fourth peak and FIG. 3*i* represents the values in storage after the fifth peak in the correlation function has been detected. The correlation function itself $e_{in}$, is shown in FIG. 3*j*. The maximum values of the correlation function $e_{in/max}$, are indicated by the dotted lines drawn from each of the peaks. It will be noted that $e_{in/max}$ is an exponential curve from each peak in the correlation function indicating that a slight decay has been built into the threshold detector. Each time that the correlation function exceeds one of the dotted lines the contents of storage are modified by connecting the sampling capacitors to the storage capacitors. Note that the firing does not take place at the intersection of the dotted curve and the correlation function but that the firing is delayed until the next peak occurs after this intersection as explained in connection with the operation of the threshold detector. The correlation function $e_{in}$ has been drawn carefully in FIG. 3*j* so that it can be seen that it is equal to the sum of the products of the contents of storage of each of the capacitors times the value of the input appearing at the tap associated with that storage capacitor at all times.

After the initial random sample, shown in FIG. 3*d*, has been inserted into the storage capacitors, the operation of the adaptive system in recognizing the particular signal begins. At time $T=0$, the correlation function, FIG. 3*j*, has reached a peak of +2 volts. The threshold detector 23 of FIG. 2 will detect this peak and will actuate the pulse generator 24. In turn, the pulse generator 24 will actuate the various relay circuits thus connecting the sampling capacitors 15 to the storage capacitors 19. The contents of storage will be modified so that the new values in storage will be as shown in FIG. 3*e*.

The correlation function, FIG. 3*j*, will next exceed $e_{in/max}$ at time approximately $T=5$. This may be seen from the intersection of the correlation function $e_{in}$ with the dotted line $e_{in/max}$ which indicates the slight delay from the previous peak of +2 volts stored in the threshold detector 23. At this time the contents of storage will again be modified as described above so that the new contents of storage will be as indicated in FIG. 3*f*. Similarly, the correlation function exceeds the maximum value previously stored in the threshold detector at times $T=11$; $T=23$ and $T=30$. At these times the contents of storage will again be modified and the resultant contents of storage at each of these times are shown in FIGS. 3*g*, 3*h* and 3*i*. The output of the commutator 41 will be the waveform shown in FIGS. 3*d* through 3*i* at the times for which these figures are drawn in the diagram. A comparison of FIGS. 3*e* through 3*i* will show that the contents of storage represent a continuously better picture of the transmitted signal. The waveform of FIG. 3*i* is an almost exact picture of the transmitted signal, shown in FIG. 3*a*, without the noise of FIG. 3*b*.

Each time there is a peak in the correlation function, $e_{in}$, the sampling capacitor 15 will be connected to the storage capacitor 19, resulting in a new average value being placed in storage. The new voltage on the storage capacitor 19 will be weighted in a manner which depends upon the ratio of the capacitance of the storage capacitor 19 to the capacitance of the sampling capacitor 15. This ratio may be denoted by the letter $n$. If $n$ is quite large, the input previously stored will be given great weight in determining the new voltage on the storage capacitor. However if $n$ is quite small, the voltage on the sampling capacitor is given great weight in determining the new voltage on the storage capacitor. A better idea of the weighting which takes place in the averaging process can be obtained with reference to FIG. 4. I have found, and it can be shown mathematically, that the weight which is given to each sample can be represented by $$\left(\frac{n}{n+1}\right)^k$$

where $n$ is the ratio of the capacitance of the storage capacitor to the capacitance of the sampling capacitor as previously mentioned and $k$ is the number of times new information has been inserted into storage or the number of repetitions of the signal. In order to obtain some appreciation of the weight of each value which is inserted into storage compared to weight of the $k$ previous values which have been inserted into storage, I have shown in FIG. 4 curves of the quantity $$\left(\frac{n}{n+1}\right)^k$$

as a function of $k$ for different values of $n$. This family of curves represents the weight given to the $k$ previous values inserted into storage for different values of $n$. Referring to the curve 60, we can determine the weight given to the previous samples when $n$, the ratio of the capacitance of the storage capacitors to the capacitance of the sampling capacitors, is equal to 5. For example, the weight given the five previous samples, $k=5$, is 0.4 and the weight given to the ten previous samples is 0.15. As another example, if $n=1$, then the most recent sample, $k=1$, is given a weight of 0.5 while the two previous samples, $k=2$, are given a weight of 0.3. The curves of FIG. 4 are quite useful in understanding how the system adapts itself to a continuously changing signal. If $n$ is chosen to be quite small, for example, $n=5$, then the system is extremely adaptive and the contents of storage reflect, primarily, the most recent information which has been inserted into storage. However, the smaller values of $n$ will not give a signal in storage which has a good definition of signal to noise. That is, the contents of storage will also reflect the noise which is contained in the more recent samples. On the other hand, if $n$ is chosen to be quite large, for example $n=40$, then a very good definition of signal to noise will be obtained in the contents of storage. This is because previously stored samples are given greater weight and the random noise contained in the large number of previous samples has cancelled out to a considerable extent. It can be seen that by varying $n$, the desired adaptiveness and definition of signal to noise can be obtained. If a number of different repetitive signals are contained in the input it would, of course, be desirable to recognize and store all of these signals.

In accordance with the embodiment of the invention shown in FIG. 5 a plurality of the adaptive filters previously described are connected to form an adaptive system which recognizes and stores a number of different repetitive signals contained in the input.

Referring to FIG. 5 there is shown a block diagram showing the broad aspect of such a system. In this system the input containing the signals plus the noise is fed into a delay line 50. The output of the delay line is fed in parallel to a number of adaptive filters. As shown in FIG. 5 three adaptive filters, 51, 52, and 53, are connected in parallel. Just as in the adaptive filters described above, the adaptive filter 51 comprises a storage unit 54 into which a random portion of the input is placed to begin the recognition process. The contents of storage are continuously compared with the input from the delay line 50. This comparison takes place in a correlator 55 which will produce a signal indicative of the correlation between the contents of the storage unit and the input which is fed into the delay line. If a high correlation exists it will be detected by a threshold detector 56. In such a case the threshold detector 56 will activate an arithmetic unit 57 so that the input will be placed in storage. The adaptive filters 52 and 53 are similar to the adaptive filter 51.

In order to prevent more than one adaptive filter from recognizing a given input signal adaptive filter 52 is additionally provided with an inhibit circuit 58 and adaptive filter 53 is additionally provided with an inhibit circuit 59. The output of the threshold detector 56 in the adaptive filter 51 is connected to the inhibit circuit 58 in adaptive filter 52 and to the inhibit circuit 59 in adaptive filter 53. Once the adaptive filter 51 has recognized a given signal the output of the threshold detector 56 will inhibit the adaptive filters 52 and 53 from recognizing this given signal.

In a similar manner the output of the threshold detector in the adaptive filter 52 is connected to the inhibit circuit 59 in the adaptive filter 53. Because of this connection, once the adaptive filter 52 has recognized a signal, adaptive filter 53 will be inhibited from also recognizing this signal. It can readily be seen that for an adaptive system including a number $q$ of adaptive filters, a number $q-1$ of inhibit circuits are required to prevent succeeding adaptive filters from recognizing a signal already being recognized by a preceding filter.

Referring to FIG. 6 there is shown a more detailed drawing of the manner in which two adaptive filters are connected together to form an adaptive system. The input containing the signals and noise is connected to a delay line 61. The outputs of the delay line, taken from taps 62, 63, and 64 are connected in parallel to adaptive filter 65 and adaptive filter 66. Adaptive filter 65 comprises relay circuits 67, cathode followers 68, multipliers 69, sampling capacitors 70, and storage capacitors 71 connected to each tap of the delay line 61. In addition, adaptive filter 65 is provided with a threshold detector 72 and a pulse generator 73.

Adaptive filter 66 comprises similar circuitry and in addition is provided with an inhibit circuit 74. In order to inhibit adaptive filter 66 from recognizing a signal which adaptive filter 65 has already recognized, the output of pulse generator 73 in adaptive filter 65 is connected to inhibit circuit 74 through a resistor 75. In order to clip the output of pulse generator 73 to a +5 volt level, the resistor 75 is connected through a clipping diode 76 to a +5 volt clipping voltage 77 which is in turn connected to ground potential.

The output of the pulse generator in adaptive filter 66 is also connected to the inhibit circuit 74. The output of this pulse generator is connected through a resistor 78 to an inverting amplifier 79. The inverted output of the pulse generator is clipped to a −5 volt level by means of a clipping diode 80 which is connected to a −5 volt clipping voltage 81 which is in turn connected to ground potential. The output of the pulse generator 73 in adaptive filter 65 is addes to the inverted output of the pulse generator in adaptive filter 66 by connecting these two outputs together through resistors 82 and 83. The result of this summation is inverted by means of an inverting amplifier 84 and all negative values of the output of this amplifier are shorted to ground by means of the clipping diode 85. The output of inhibit circuit 74, taken from the output of the inverting amplifier 84, is connected to energize all of the relay circuits of adaptive filter 66.

The operation of the adaptive system of FIG. 6 is as follows:

Adaptive filter 65 recognizes and stores a given signal in the manner previously described in conjunction with the single adaptive filter. Each time adaptive filter 65 recognizes this given signal pulse generator 73 produces an output which inhibits inhibit circuit 74 in adaptive filter 66. The positive pulse from pulse generator 73 is clipped to +5 volts by the clipping diode 76. If adaptive filter 66 begins recognition of the same signal the pulse generator in adaptive filter 66 produces a pulse coincidentally in time with the pulse from pulse generator 73. The pulse from the pulse generator in adaptive filter 66 is inverted by inverting amplifier 79 and clipped to a −5 volt level by the clipping diode 80. When the +5 volt pulse from pulse generator 73 and the −5 volt pulse from the pulse generator in adaptive filter 66 are added together through the resistors 82 and 83, they cancel each other and the output of inverting amplifier 84 is zero. Therefore, the relay circuits of adaptive filter 66 will not be actuated; that is, adaptive filter 66 is inhibited from recognizing and storing this particular signal. If, on the other hand, adaptive filter 66 recognizes a signal different from that recognized by adaptive filter 65, that is, one which occurs at a different time, the output of the pulse generator in adaptive filter 66 will pass through the inverting amplifier 79; it will not be cancelled by a coincident pulse from pulse generator 73 in adaptive filter 65; it will again be inverted by the amplifier 84; and the resultant output will actuate the relay circuits in adaptive filter 66. In such a case the adaptive filter 66 is not inhibited from recognizing this signal.

While only two adaptive filters have been shown connected to form an adaptive system in FIG. 6, it should be understood that a large number of adaptive filters can be connected together to form adaptive system and that each adaptive filter is connected to inhibit all succeeding adaptive filters from recognizing the same signal which is being recognized in that adaptive filter.

While certain specific embodiments of my invention have been shown and described, it will, of course, be understood that various other modifications may be made without departing from the principles of the invention. The appended claims are therefore intended to cover any modifications within the true spirit and scope of the invention.

What I claim as new and desire to secure by Letters Patent of the United States is:

1. An adaptive filter for recognizing a signal contained in an input comprising sampling means for sampling voltages indicative of said input, storage means for storing voltages indicative of said signal, correlation means for producing an output indicative of the correlation between the voltages in said storage means and the voltages in said sampling means, a threshold detector, said correlation means being connected to said threshold detector, said threshold detector producing an output only when the output of said correlation means reach a peak which exceeds a predetermined fraction of the previous maximum peak output of said correlation means, and means for connecting said sampling means to said storage means in response to an output of said threshold detector.

2. An adaptive filter for recognizing a signal contained in an input comprising a delay line having a plurality of taps, said input being applied to said delay line so that said input appears at the taps of said delay line delayed by an increasing increment of time at each tap, sampling means connected to each of said taps for sampling voltages indicative of said input, storage means for storing voltages indicative of said signal, correlation means for determining the correlation between the stored voltages and the sampled voltages and means for transferring the voltages from said sampling means to said storage means when the correlation between the stored and the sampled voltages reaches a predetermined value whereby the stored voltages become indicative of only the signal contained in the input.

3. An adaptive filter for recognizing a signal contained in an input comprising delay means having a plurality of taps, said input being applied to said delay means so that said input appears at the taps of said delay means delyed by an increasing increment of time at each tap, sampling means connected to each of said taps for sampling voltages indicative of said input, storage means for storing voltages indicative of said signal, correlation means for producing an output indicative of the correlation between the voltages in said storage means and the voltages in said sampling means, a threshold detector, said correlation means being connected to said threshold detector, said threshold detector producing an output only when the output of said correlation means reaches a peak which exceeds a predetermined fraction of the previous maximum peak output of said correlation means, and means for connecting said sampling means to said storage means in response to an output of said threshold detector.

4. An adaptive filter for recognizing a signal contained in an input comprising a delay line having a plurality of taps, said input being applied to said delay line so that said input appears at the taps of said delay line delayed by an increasing increment of time at each tap, a plurality of sampling capacitors for sampling voltages indicative of said input, means for connecting each sampling capacitor to a corresponding one of said taps of said delay line, a plurality of storage capacitors for storing voltages indicative of said signal, means for connecting each of said sampling capacitors to a corresponding storage capacitor, correlation means for determining the correlation between the voltages on said storage capacitors and the voltages on the corresponding sampling capacitors, a threshold detector, said correlation means being connected to said threshold detector, said threshold detector producing an output only when the output of said correlation means reaches a peak which exceeds a predetermined fraction of the previous maximum peak output of said correlation means, said threshold detector being connected to said means for connecting said sampling capacitors to said storage capacitors whereby each of said sampling capacitors is connected to a corresponding one of said storage capacitors only when said threshold detector produces an output.

5. An adaptive filter for recognizing a signal contained in an input comprising a plurality of sampling means for sampling voltages indicative of said input, a plurality of storage means for storing voltages indicative of said signal, a plurality of multipliers, each of said sampling means and each of said storage means being connected to a corresponding one of said multipliers so that the output of each multiplier is the product of the voltage in said storage means times the voltage in the corresponding sampling means, a threshold detector, the outputs of said multipliers being connected to the input of said threshold detector so that the input to said threshold detector is equal to the sum of said products of voltages, said threshold detector producing an output only when the input of said threshold detector reaches a predetermined value, a plurality of connection means for connecting said sampling means to said storage means, the output of said threshold detector being connected to said connection means so that said connection means are actuated only when said threshold detector produces an output.

6. An adaptive filter of the type in which a storage capacitor becomes charged to a voltage indicative of a signal contained in an input after $k$ successive repetitions of said signal comprising a sampling capacitor, said input being connected to said sampling capacitor so that said sampling capacitor is normally charged to a voltage indicative of the input, a storage capacitor having $n$ times the capacity of said sampling capacitor, correlation means for determining the correlation between the voltage on said sampling capacitor and the voltage on said storage capacitor, and means for momentarily connecting said sampling capacitor to said storage capacitor, said last-named means being actuated in response to said correlation means producing a peak output which exceeds a predetermined fraction of the previous maximum peak output of said correlation means, said storage capacitor being charged to a voltage which is weighted in favor of the $k$ previous signals contained in said input by a factor of $$\left(\frac{n}{n+1}\right)^k$$

7. An adaptive filter as recited in claim 6 comprising N sampling capacitors, N storage capacitors, each being associated with one of said sampling capacitors, and N means for momentarily connecting each of said sampling capacitors to an associated storage capacitor in response to a peak output of said correlation means which exceeds a predetermined fraction of the previous maximum peak output of said correlation means.

8. An adaptive filter for recognizing a signal contained in an input comprising sampling means for sampling voltages indicative of said input, storage means for storing voltages indicative of said signal, a multiplier, said sampling means and said storage means being connected to said multiplier whereby the output of said multiplier is the product of the sampled voltages and the stored voltages, a threshold detector, said multiplier being connected to said threshold detector, said threshold detector producing an output only when said product reaches a peak which exceeds a predetermined fraction of the previous maximum peak value of said product, and means connected to said threshold detector for transferring the sampled voltages from said sampling means to said storage means in response to the output of said threshold detector.

9. An adaptive filter for recognizing a signal contained in an input comprising a delay line having N equally spaced taps, said input being fed into said delay line, N sampling capacitors, N relays each having a normally closed set of contacts and a normally open set of contacts, each of said sampling capacitors being connected to a corresponding one of said taps through said set of normally closed contacts so that said sampling capacitors are normally charged to a voltage indicative of the input, N storage capacitors, N multipliers, each of said taps being connected to a corresponding one of said multipliers and each of said storage capacitors being connected to a corresponding one of said multipliers so that the output of each multiplier is the product of the voltage indicative of the input at the tap connected to the multiplier times the voltage stored on the storage capacitor connected to the multiplier, a threshold detector, the outputs of said multipliers being connected to the input of said threshold detector so that the input to said threshold detector is equal to the sum of said products of voltages, said threshold detector producing an output only when the input to said threshold detector reaches a peak which exceeds a predetermined fraction of the previous maximum peak input to said threshold detector, N relay circuits for actuating said relays, the output of said threshold detector being connected to said relay circuits so that said relays are actuated only when said threshold detector produces an output, each of said sampling capacitors being connected to a corresponding one of said storage capacitors through said set of said normally open contacts when said relays are actuated whereby said storage capacitors become charged to voltages indicative of the signal contained in the input.

10. An adaptive filter of the twpe in which a plurality of storage capacitors become charged to a voltage indicative of a signal contained in an input after $k$ successive repetitions of said signal comprising a delay line having N equally spaced taps, said input being fed into said delay line, N sampling capacitors, N relays each having a normally closed set of contacts and a normally open set of contacts, each of said sampling capacitors being connected to one of said taps through a set of normally closed contacts so that said sampling capacitor is normally charged to a voltage indicative of the input, N storage capacitors each having $n$ times the capacity of said sampling capacitors, N multipliers, each of said taps being connected to a corresponding one of said multipliers and each of said storage capacitors being connected to a corresponding one of said multipliers so that the output of each multiplier is the product of the voltage indicative of the input at the tap connected to the multiplier times the voltages stored on the storage capacitor connected to the multiplier, a threshold detector, the outputs of said multipliers being connected to the input of said threshold detector so that the input to said threshold detector is equal to the sum of said products of voltages, said threshold detector producing an output only when the input to said threshold detector reaches a peak which exceeds a predetermined fraction of the previous maximum peak input to said threshold detector, N relay circuits for actuating said relays, the output of said threshold detector being connected to said relay circuits so that said relays are actuated only when said threshold detector produces an output, each of said sampling capacitors being connected to a corresponding one of said storage capacitors through a set of normally open contacts when said relays are actuated, said storage capacitors being charged to a voltage which is weighted in favor of the $k$ previous signals contained in said input by a factor of $$\left(\frac{n}{n+1}\right)^k$$

11. A threshold detector for producing an output when the input to said threshold detector reaches a peak which exceeds the previous peak input to said threshold detector comprising a capacitor, a diode, said input being connected to said capacitor through said diode so that said capacitor is normally charged to a voltage indicative of the previous maximum voltage of said input, an amplifier for inverting said input, a summing network, said voltage on said capacitor and said inverted input voltage being connected as inputs to said summing network, an amplifier receiving the output of said summing network, and diode means coupled to the output of said last mentioned amplifier.

12. An adaptive system for recognizing and storing a plurality of signals contained in an input comprising a plurality of adaptive filters which each recognize one of said plurality of signals, said input being connected to said plurality of adaptive filters in parallel, each of said adaptive filters comprising a sampling means for sampling voltages indicative of said input, storage means for storing voltages indicative of said signal, correlation means for producing an output indicative of the correlation between the voltages in said storage means and the voltages in said sampling means, a threshold detector, said correlation means being connected to said threshold detector, said threshold detector producing an output only when the output of said correlation means reaches a peak which exceeds a predetermined fraction of the previous maximum peak output of said correlation means, means for connecting said sampling means to said storage means in response to an output of said threshold detector and an inhibit circuit, the output of the threshold detector of each adaptive filter being connected to the input to the inhibit circuits of all succeeding adaptive filters, said inhibit circuit being connected between the threshold detector and the connecting means in each adaptive filter whereby an output from a threshold detector in one adaptive filter inhibits the output of the threshold detectors in all succeeding adaptive filters.

13. An adaptive system for recognizing a plurality of signals contained in an input comprising a delay line having a plurality of taps, said input being applied to said delay line so that said input appears at the taps of said delay line delayed by an increasing increment of time at each tap, a plurality of adaptive filters, each of said taps being connected to all of said adaptive filters in parallel, each of said adaptive filters comprising sampling means connected to each of said taps for sampling voltages indicative of said input, storage means for storing voltages indicative of one of said plurality of signals, correlation means for producing an output indicative of the correlation between the voltages in said storage means and the voltages in said sampling means, a threshold detector, said correlation means being connected to said threshold detector, said threshold detector producing an output only when the output of said correlation means reaches a peak which exceeds a predetermined fraction of the previous maximum peak output of said correlation means, means for connecting said sampling means to said storage means in response to an output of said threshold detector and an inhibit circuit, said inhibit circuit being connected between said threshold detector and said connecting means in each adaptive filter, the output of said threshold detector in each adaptive filter being connected to the inhibit circuits of all succeeding adaptive filters whereby the output of the threshold detector in each adaptive filter inhibits the output of the threshold detectors in all succeeding adaptive filters.

14. An adaptive system for recognizing and storing a plurality of signals contained in an input comprising $q$ adaptive filters of the type including sampling means for sampling voltages indicative of said input, storage means for storing voltages indicative of said signal, correlation means for producing an output indicative of the correlation between the voltages in said storage means and the voltages in said sampling means, a threshold detector, said correlation means being connected to said threshold detector, said threshold detector producing an output only when the output of said correlation means reaches a peak which exceeds the previous maximum peak output of said correlation means, means for connecting said sampling means to said storage means in response to an output of said threshold detector and $q-1$ inhibit circuits, each of said inhibit circuits being connected between the threshold detector and the connecting means of each adaptive filter, the output of the threshold detector of each adaptive filter being connected to the input to the inhibit circuits of all succeeding adaptive filters whereby the recognition of a signal by one adaptive filter inhibits the recognition of that particular signal by all succeeding adaptive filters.

15. An adaptive system for recognizing a signal contained in an input comprising temporary storage means, means impressing said input on said temporary storage means, a plurality of sampling means energized from said temporary storage means continuously sampling voltages of said input at spaced intervals of time, a plurality of storage means each associated with one of said sampling means for storing voltages indicative of said signal, correlation means for producing an output indicative of the correlation between the voltages in the respective storage means and sampling means and means for adding at least a proportion of the voltages from said sampling means to the associated storage means only when the indicated correlation therebetween exceeds a predetermined value.

16. An adaptive filter for recognizing a signal contained in an input comprising sampling means for obtaining time spaced sample voltages indicative of said input, storage means for storing time spaced voltages indicative of said signal, means for producing an output indicative of the correlation between the voltages in said storage means and the voltages in said sampling means, threshold means responsive to said last mentioned means for adding values at least proportioned to the contents of said sampling means to said storage means and means restricting operation of said threshold means to successively higher levels of indicated correlation between the sample voltages and voltages in storage as the voltages in storage approach a definition of the signal.

17. An adaptive system for recognizing a signal contained in an input comprising temporary storage means, means impressing said input on said temporary storage means, a plurality of sampling means energized in parallel from said temporary storage, means continuously deriving sample voltages from said input, storage means associated respectively with said sampling means for storing voltages indicative of said signal, correlation means for producing an output indicative of the correlation between the sample voltages in said sampling means and the corresponding voltages in said storage means and means for adding voltages proportioned to the corresponding voltages of said sampling means to said storage means only when the indicated correlation therebetween exceeds a predetermined variable value which increases as the voltages in storage approach the corresponding sampled voltages of the signal.

18. Apparatus for significant signal recognition comprising input means, means for storing a standard signal, means for comparing an input from said input means with the stored standard to produce a voltage indicative of the degree of correlation, threshold means for testing said correlation, and means for successively combining with said stored standard quantities proportioned to successive portions of input which compare favorably with said standard in response to said threshold means when the said correlation exceeds a predetermined threshold value, said threshold means being responsive to occurrence of a favorable comparison for rising the said predetermined threshold value.

19. The apparatus of claim 18 wherein the means for storing a standard signal also has the characteristic of depleting the standard signal with time.

20. The apparatus of claim 18 wherein the threshold means also has the characteristic of depleting the threshold value with time.

21. Apparatus for deriving a repetitive signal from an input comprising: input signal coupling means; storage for retaining a plurality of elementary indications representative of a particular signal; threshold means for detecting a degree of coincidence between a series of elementary indications in said input signal and ones of a corresponding series of elementary indications in said storage; means responsive to the detection of said degree of coincidence for combining, with storage, proportional values corresponding to the like elementary indications in the input; and means also responsive to such detection for raising the degree of coincidence at which said threshold means is operative.

22. Apparatus for deriving a repetitive signal from an input comprising input signal coupling means; storage for retaining a plurality of elementary indications representative of a particular signal; threshold means for detecting a degree of coincidence between a series of elementary indications in said input signal and ones of a corresponding series of elementary indications in said storage; means responsive to the detection of said degree of coincidence for combining, with storage, proportional values corresponding to the like elementary indications in the input including means for giving greater weight to the most recent value in the combination as compared to earlier particular values; and means also responsive to such detection for raising the degree of coincidence at which said threshold means is operative.

23. The apparatus of claim 22 further including means for decreasing the value in storage of said elementary indications with time.

24. An adaptive system for recognizing a signal contained in an input comprising a plurality of sampling means energized from said input and continuously sampling voltages of said input at spaced intervals of time, a plurality of storage means each associated with one of said sampling means for storing voltages indicative of said signal, correlation means for producing an output indicative of the correlation between the voltages in the respective storage means and sampling means, and means for bringing the respective sampling means and associated storage means into substantial voltage equilibrium when the indicated correlation exceeds a predetermined value.

25. The apparatus of claim 24 wherein said sampling means and said storage means are capacitors.

26. The apparatus of claim 25 further including means for discharging with time the said capacitors forming the storage means.

27. The method of separating a repeated signal from random noise in an input comprising the steps of storing at least a portion of the said input, successively comparing other portions of the said input therewith to ascertain similarities between said portions, combining said similarities with said stored portions when comparison exceeds a predetermined threshold value, and raising said predetermined threshold value in response to the occurrence of an indication of similarity.

28. A method of significant signal recognition comprising the steps of comparing an electrical input with a stored standard, successively combining with said stored standard quantities proportioned to successive portions of input which compare favorably with said standard in excess of a predetermined comparison threshold level, and varying said predetermined threshold level upward in response to the occurrence of favorable comparison substantially in accordance with the degree of repetition of occurrence thereof and downward as said degree of repetition decreases.

29. The method of separating a repeated signal from random noise in an input, the noise having the characteristic of diverse value and polarity, said method comprising the steps of storing at least a portion of the said input, comparing other portions of the said input therewith to ascertain the cross-correlation between said portions, combining with said stored portions other portions producing a high cross-correlation with said stored portions above a predetermined threshold value, and raising said threshold value in response to the occurrence of such favorable comparison.

30. The method of separating a repeated signal from random noise in an input comprising the steps of storing a series of elements contained in said input, comparing other portions of the said input therewith to ascertain similarities between further series of elements in the input and the stored elements, combining proportions of the further elements with corresponding stored elements in response to an overall indication of likeness exceeding a predetermined threshold value, and raising said predetermined threshold value in response to indication of likeness.

References Cited in the file of this patent

UNITED STATES PATENTS

| | | |
|---|---|---|
| 2,760,134 | Johnson | Aug. 21, 1956 |
| 2,834,883 | Lukoff | May 13, 1958 |